(12) United States Patent
Walker et al.

(10) Patent No.: US 8,612,149 B2
(45) Date of Patent: Dec. 17, 2013

(54) SYSTEM AND METHOD OF RELATIVE LOCATION DETECTION USING IMAGE PERSPECTIVE ANALYSIS

(75) Inventors: David Ryan Walker, Waterloo (CA); Steven Henry Fyke, Waterloo (CA)

(73) Assignee: BlackBerry Limited, Waterloo (CA)

( * ) Notice: Subject to any disclaimer, the term of this patent is extended or adjusted under 35 U.S.C. 154(b) by 497 days.

(21) Appl. No.: 13/024,890

(22) Filed: Feb. 10, 2011

(65) Prior Publication Data
US 2012/0209513 A1    Aug. 16, 2012

(51) Int. Cl.
*G01C 21/20* (2006.01)
*G05D 1/02* (2006.01)

(52) U.S. Cl.
USPC .............. 701/523; 701/436; 701/448

(58) Field of Classification Search
USPC ........ 701/426, 430, 431, 436, 448, 495, 514, 701/516, 517, 523; 455/456.1, 456.2, 455/456.3, 456.6, 457
See application file for complete search history.

(56) References Cited

U.S. PATENT DOCUMENTS

| | | | | |
|---|---|---|---|---|
| 6,604,049 | B2 * | 8/2003 | Yokota | 701/484 |
| 6,782,419 | B2 * | 8/2004 | Tobita et al. | 709/219 |
| 7,103,472 | B2 * | 9/2006 | Itabashi | 701/420 |
| 7,689,001 | B2 | 3/2010 | Kim | |
| 2003/0074129 | A1 * | 4/2003 | Curbow et al. | 701/200 |
| 2006/0002590 | A1 * | 1/2006 | Borak | 382/104 |
| 2006/0227047 | A1 | 10/2006 | Rosenberg | |
| 2007/0200713 | A1 | 8/2007 | Weber et al. | |
| 2008/0039120 | A1 * | 2/2008 | Gad | 455/456.2 |
| 2010/0184483 | A1 | 7/2010 | Kao | |
| 2011/0098918 | A1 * | 4/2011 | Siliski et al. | 701/201 |
| 2011/0313653 | A1 * | 12/2011 | Lindner | 701/201 |

FOREIGN PATENT DOCUMENTS

CN    101655369    2/2010

OTHER PUBLICATIONS

European Search Report dated Jun. 7, 2011. In corresponding application No. 11154085.2.
I-Hsien Chen, et al. "Efficient Vision-Based Calibration from Visual Surveillance Systems with Multiple PTZ Cameras", Computer Vision Systems, 2006 ICVS '06 IEEE International Conference on New York, NY, USA Jan. 4-7, 2006, Piscataway, NJ, USA, IEEE, Jan. 4, 2006, pp. 24-24 XP010899377, DOI: DOI:10.1109/ICVS.2006.22 ISBN:978-0-7695-2506-8.
Yagi Y. et al. "Detection of unknown moving objects by reciprocation of the observed information by reciprocation of observed information between mobile robot", Intelligent Robots and Systems '94, Advanced Robotic Systems and the Real World', IROS' 94. Proceedings of the IEEE/RSJ/GI International CO NFERENCE on Munich, Germany Sep. 12-16, 1994, New York, NY, USA, IEEE, vol. 2, Sep. 12, 1994, pp. 996-1003, XP010141902, DOI: DOI:10.1109/IROS. 1994.407481 ISNB 978-7803-1933-2.

(Continued)

*Primary Examiner* — Jason Holloway
(74) *Attorney, Agent, or Firm* — Novak Druce Connolly Bove + Quigg LLP

(57) ABSTRACT

A system and method of relative location detection on an electronic device using image perspective analysis. The electronic device will consist of a processor module coupled to a camera module. The camera module of an electronic device as well as a target device will be used to capture image(s) of the current surroundings, including common elements, which will then be used to obtain the relative location of the devices in reference to one another.

20 Claims, 7 Drawing Sheets

(56) References Cited

OTHER PUBLICATIONS

Damian M. Lyons:"Sharing and Fusing landmark information in a team of autonomous robots", Multi sensor, Multi source information Fusion: Architectures, Algorithms, and Applications 2009, SPIE, [Online] vol. 7345, Apr. 1, 2009, pp. 73450G-73450G, XP007918742, DOI:DOI:10.1117/12.818363 Retrieved from the Internet: URL:http://adsabs.harvard.edu/abs/2009SPIE.7345E..15L [retrieved on May 25, 2011].

Wanji Mai, et al. "Recognizing Buildings using a Mobile system and a reference city model", Proceedings of the SPIE, SPIE, Bellingham, VA, US, vol. 3081, Jan. 1, 2005, pp. 284-298, XP007918726, ISSN:0277-786X, DOI: DOI: 10.1007/11407546_16 abstract, p. 285 and p. 286, first paragraph.

Wanji Mai, et al. "Building identification for location-based services", Proceedings/The Irish Signals and Systems conference 2004: Queen's University Belfast, Northern Ireland, Jun. 30, Jul. 2, 2004, Institute of Electrical Engineers,GB. Jun. 30, 2004, pp. 639-644, XP008137031, ISBN: 978-0-86341-440-4.

Wanji Mai, et al. "A PDA-Based System for Recognizing Buildings from User-Supplied Images", Jan. 27, 2004, Mobile and Ubiquitous Information Access; [Lecture Notes in Computer Science ; LNCS], Springer-Verlag, Berlin/Heidelberg, pp. 143-157, XP019002474, ISBN: 978-3-540-21003-0.

Database WPI Week 201118 Thomas Scientific, London, GB; An 2011-A33511 XP002639015, & CN 101 917 776 A (Shanghai Zhongwei Intelligent Robotics C ) Dec. 15, 2010.

Kim-Hui Yap et al. "A Comparative Study of Mobile-Based Landmark Recognition Techniques", IEEE Intelligent Systems, IEEE, US, vol. 25, No. 1, Jan. 1, 2010, pp. 48-57, XP011305128, ISSN: 1541-1672.

Examination report mailed on Apr. 12, 2012. In corresponding European patent application No. 11154085.2.

Designing Interactions for navigation in 3D Mobile maps, Nurminrn; Oulasvirta in "map-based mobile services" : "design, interaction, and usability", Liqiu Meng, Alexander Zipf, Stephan Winter, Springer, 2008, ISBN 978-3-540-37109-0. pp. 198-224.

Why Not; GPS from photosynth or similar. (http://www.whynot.net/ideas/3735). Retrieved on May 2, 2012.

Seadragon: Seadragon is designed to inspire and enable new scenarios for viewing information online. http://www.seadragon.com/; http://www.ted.com/talks/blaise_aguera_y_arcas_demos_photosynth.html. Retrieved on May 2, 2012.

The Gmap Uploader is a service that allows you to upload any map or image you want into the Google Maps interface. From there, you can use the Google Maps API to put markers, info windows (bubbles), and polylines (routes) on your map. http://gmapuploader.com. Retrieved on May 2, 2012.

Mobile Help; http://www.google.com/support/mobile/bin/answer.py?hl=en&answer=166331. Retrieved on May 2, 2012.

Tollmar, Konrad, Tom Yeh, and Trevor Darrell; "IDeixis—Image-based Deixis for Finding Location-Based Information;" MIT CSAIL, 200 Technology Square, Cambridge, MA.

Tollmar, Konrad, Tom Yeh, and Trevor Darrell; "IDeixis: Mobile Image-Based Search on World Wide Web—A Picture is Worth a Thousand Keywords," MIT—Computer Science and Artificial Intelligence Laboratory; LU—Dept of Informatics.

Li, Yiqun and Joo-Hwee Lim; "Outdoor Place Recognition using Compact Local Descriptors and Multiple Queries with User Verification," Institute for Infocomm Research, Singapore.

Sali, Serdar, "Image Recognition on Mobile Phones".

Amlacher, Katrin; Patrick Luley, Gerald Fritz, Alexander Almer, and Lucas Paletta; "Mobile Object Recognition Using Multi-Sensor Information Fusion in Urban Environments", Joanneum Research Forschungsgesellschaft mbH, Graz, Austria.

Yeh, Tom, Konrad Tollmar, and Trevor Darrell; "Searching the Web with Mobile Images for Location Recognition", MIT CSAIL, Cambridge, MA; IEEE, 2004.

Fritz, Gerald, Christin Seifert and Lucas Paletta; "A Mobile Vision System for Urban Detection with Informative Local Descriptors", Institute of Digital Image Processing, Joanneum Research Forschungsgesellschaft mbH; Graz, Austria.

Takacs, Gabriel, et al.; "Outdoors Augmented Reality on Mobile Phone using Loxel-Based Visual Feature Organization", Vancouver, BC, Canada, MIR 2008.

Henrysson, Anders and Mark Ollila; "UMAR—Ubiquitous Mobile Augmented Reality", College Park, Maryland, MUM 2004.

Yeh, Tom, et al.; "A Picture is Worth a Thousand Keywords: Image-Based Object Search on a Mobile Platform"; MIT CSAIL, USA; Lund University, Sweden; Portland Oregon, CHI 2005.

Rohs, Michael; "Real-World Interaction with Camera-Phones", Institute for Pervasive Computing; Dept of Computer Science, Swiss Federal Institute of Technology, Zurich, Switzerland.

* cited by examiner

SYSTEM AND METHOD OF RELATIVE LOCATION DETECTION USING IMAGE PERSPECTIVE ANALYSIS

FIELD OF TECHNOLOGY

The subject matter herein generally relates to electronic devices, and more specifically relates to a system and method of determining a relative location of an electronic device using image perspective analysis.

BACKGROUND

Location detection is a popular feature of many electronic devices. With the advent of more robust electronic systems, advancements of location detection on electronic devices are becoming more prevalent. Electronic devices having global positioning system (GPS) capabilities can provide location detection.

BRIEF DESCRIPTION OF THE DRAWINGS

Embodiments of the present technology will now be described, by way of example only, with reference to the attached figures. Those of ordinary skill in the art will appreciate that the order of the steps illustrated in the present figures and described herein are for exemplary purposes only. Those of ordinary skill in the art will appreciate that the steps of the method for relative location detection using image perspective analysis can be performed in a different order than as illustrated and described to achieve the technical benefits described herein. Furthermore, steps described in the implementations of the present technology can be combined to achieve the technical benefits described herein. Additionally, fewer or more steps than illustrated in FIG. 4 can be included.

DETAILED DESCRIPTION

Figure 2:
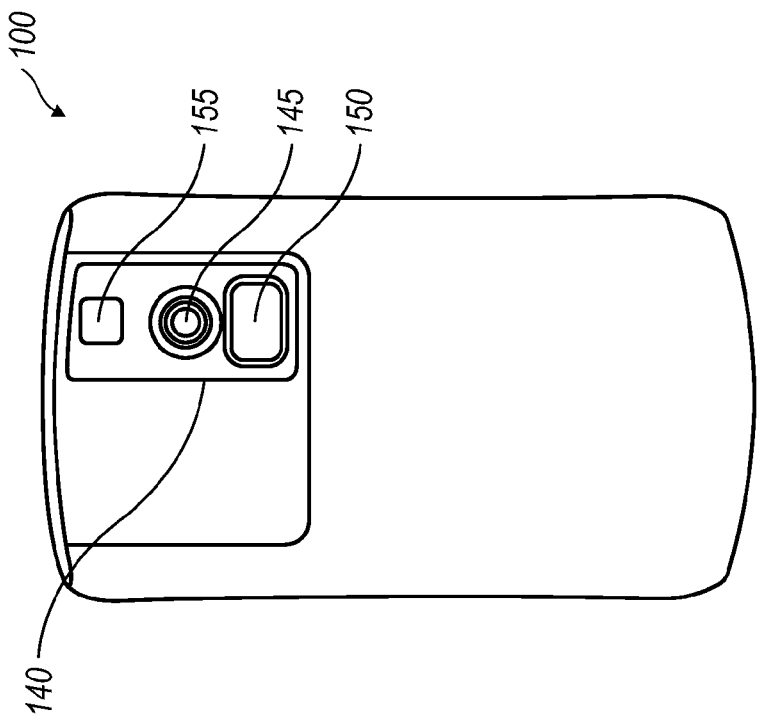
FIG. 2 is a rear view of the exemplary electronic device illustrated in FIG. 1.

For simplicity and clarity of illustration, where appropriate, reference numerals have been repeated among the different figures to indicate corresponding or analogous elements. In addition, numerous specific details are set forth in order to provide a thorough understanding of the embodiments described herein. However, those of ordinary skill in the art will understand that the embodiments described herein can be practiced without these specific details. In other instances, methods, procedures and components have not been described in detail so as not to obscure the related relevant feature being described. Also, the description is not to be considered as limiting the scope of the embodiments described herein.

Several definitions that apply throughout this disclosure will now be presented. The word "coupled" is defined as connected, whether directly or indirectly through intervening components, and is not necessarily limited to physical connections. The term "communicatively coupled" is defined as connected whether directly or indirectly though intervening components, is not necessarily limited to a physical connection, and allows for the transfer of data. The term "electronic device" is defined as any electronic device that is capable of at least accepting information entries from a user and includes the device's own power source. A "wireless communication" means communication that occurs without wires using electromagnetic radiation. The term "memory" refers to transitory memory and non-transitory memory. For example, non-transitory memory can be implemented as Random Access Memory (RAM), Read-Only Memory (ROM), flash, ferromagnetic, phase-change memory, and other non-transitory memory technologies.

As electronic devices advance, consumers require more advanced features to be available on the devices and expect those features to perform accurately. Location detection is a popular feature of many electronic devices, but problems arise when accuracy of better than a few hundred feet is required, particularly when two device users are attempting to locate each other in a relatively crowded area. Consumer-based GPS accuracy is not high enough to enable a first user to locate with substantial precision a second user within a small geographic area, such as a crowded intersection or concert hall. The respective GPS devices of the two users may indicate that the users are at the same location, but are still far enough apart that the users cannot find each other. Accordingly, the present disclosure provides a system and method of relative location detection using image perspective analysis on an electronic device, which provides the level of accuracy necessary to enable a first user to determine the location of a second user relative to the first user.

The system and method of relative location detection using image perspective analysis on an electronic device can include a camera module, a transmitter module, one or more sensors adapted to provide motion characteristics of the electronic device, a receiver module, a processor module adapted to receive photographic data from the camera module, and a display coupled to the processor module. In at least one implementation the one or more sensors can include a magnetometer and an accelerometer. Additionally, in at least one implementation, the transmitter module and receiver module can be combined in a transceiver module. With the system and method of relative location detection using image perspective analysis on an electronic device disclosed herein, accuracy of location detection can be maximized.

Figure 1:
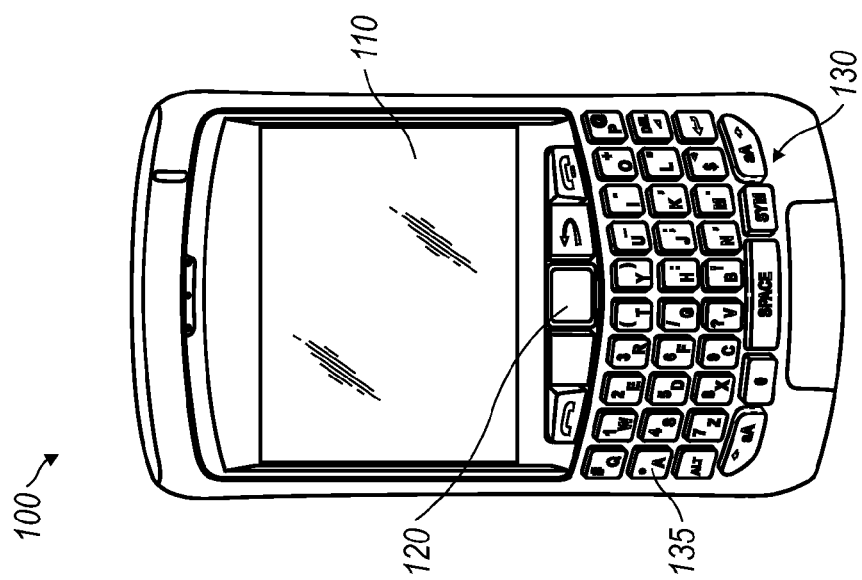
FIG. 1 is a front view of an electronic device configured for relative location detection using image perspective analysis in accordance with an exemplary implementation of the present technology.

FIG. 1 illustrates a front view of an exemplary electronic device. The illustrated electronic device 100 is a cellular phone but can also be a smart phone, a netbook, an electronic tablet, an electronic pad, a personal digital assistant (PDA), or any other electronic device which includes a display, a camera module, and a processor communicatively coupled to the display and to the camera module. The electronic device 100 can include a display screen 110 on which photos, videos, user interfaces (UIs), or any other graphical item can be displayed. The display screen 110 can be a liquid crystal display (LCD), a light emitting diode (LED) display, an active matrix organic light emitting diode display (AMOLED), a nanocrystal display, a nanotube display, a touch-sensitive display screen, or any other display screen on which text, graphical or visual items can be displayed. A navigation tool 120, such as an optical trackpad as illustrated in FIG. 1, can be located below the display 110, but in other embodiments can be located in other directions with respect to the display. However, one of ordinary skill in the art will appreciate that the navigation tool 120 can also be an optical trackball, a trackball, a jog dial, an omnidirectional joystick, or any other navigation tool at which inputs can be received and output to alter the display screen 110. Additionally, a navigation tool may not be necessary where the device utilizes a touch screen display for navigational inputs. In FIG. 1, a keyboard 130 having a plurality of keys 135 can be positioned below the navigation tool 120. In the illustrated implementation, each key 135 of the keyboard 130 bears at least one of an alphabetic, numeric, symbolic, or functional indicia. The indicia signify the data to be input upon actuation of the key 135 bearing the indicia. In FIG. 1, the keyboard 130 is a full keyboard having each key 135 associated with an alphabetic indicia. In an alternative implementation, the keyboard 130 can be a reduced keyboard, where at least one key 135 is associated with more than one alphabetic indicia. The indicia on the keys 135 of the keyboard 130 in FIG. 1 are arranged in a QWERTY keyboard layout; however, one of ordinary skill in the art will appreciate that the keyboard layout can be an AZERTY layout, a QWERTZ layout, a DVORAK layout, a pinyin Chinese keyboard layout, or any other keyboard layout that allows a user to input alphabetic, numeric, symbolic, and functional indicia. The keys 135 can be press-actuable keys, touch-sensitive keys, capacitive keys, or any other similar key that allows for the input of data to a processor of the electronic device 100 upon user-engagement with the key 135.

FIG. 2 is a rear view of the exemplary electronic device 100 illustrated in FIG. 1. A camera module 140 can be on the rear side of the electronic device 100. In at least the implementation illustrated in FIG. 2, the camera module 140 can include a camera lens 145 communicatively coupled to a flash module 155, and a mirrored surface 150. Images sensed by the camera lens 145 can be captured as photographs or videos using a camera application executed by a processor (not shown) communicatively coupled to the camera module 140. The flash module 155 can provide light to assist in exposing the object or objects to be captured as a photograph or video by the camera lens. In other embodiments, the configuration of the flash module 155, camera lens 145, and mirrored surface 150 can be located in different positions relative to one another as well as different positions on the backside of the electronic device 100. In at least one implementation, the flash module 155, camera lens 145 and mirror 150 can be located on the front side of the electronic device 100.

Figure 3:
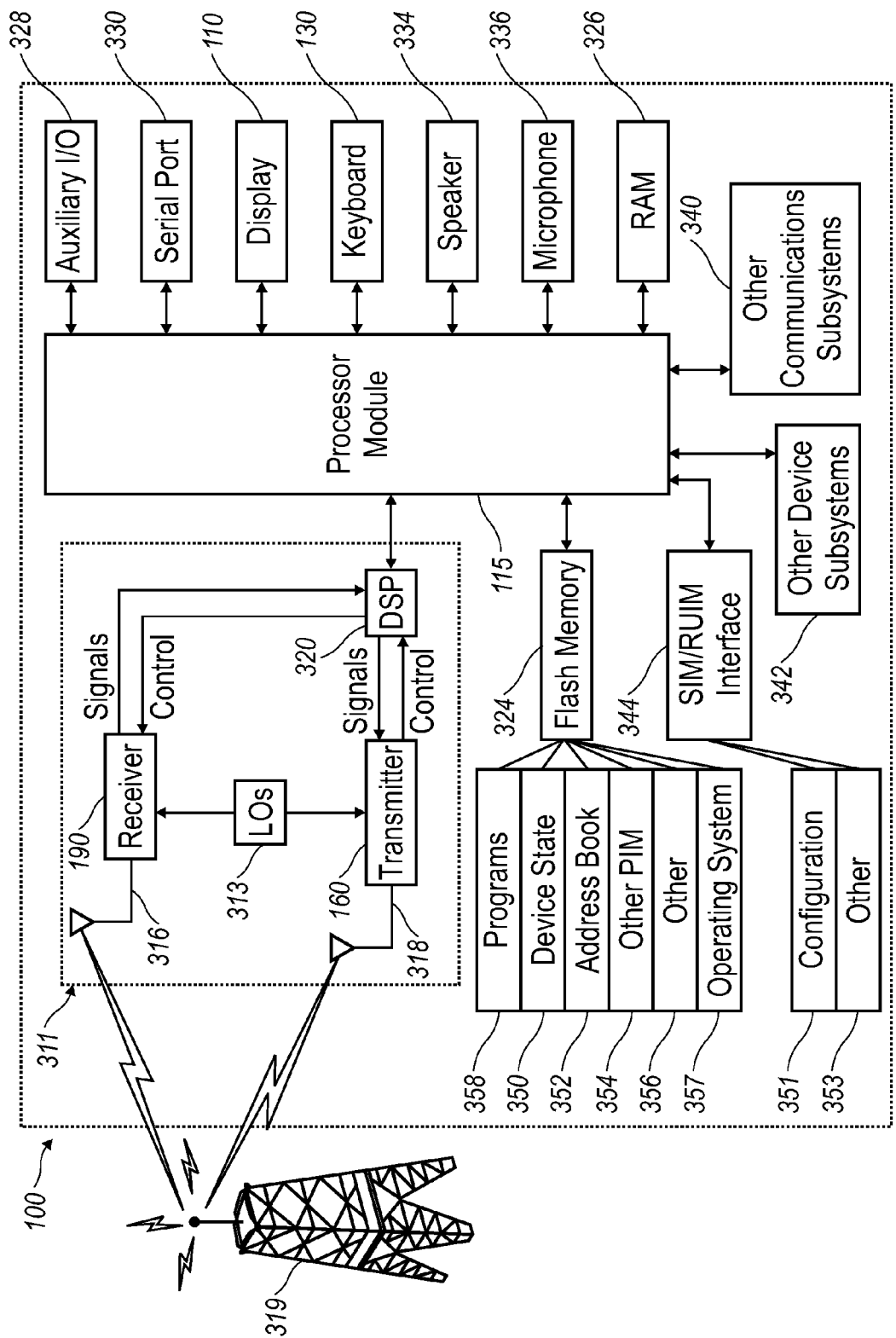
FIG. 3 is a block diagram representing an electronic device configured in accordance with an exemplary implementation of the present technology.

Referring now to FIG. 3, the electronic device 100 includes a communication subsystem 342 to perform communication transmission and reception with a wireless network 319. A processor module 115 can be connected with an auxiliary input/output (I/O) subsystem 328 which can be coupled to the electronic device 100. The processor module 115 can include one or more processors. Additionally, the processors can be micro-processors, for example. In at least one implementation, the processor module 115 can be coupled to a serial port (for example, a Universal Serial Bus port) which can allow for communication with other devices or systems. The display 110 can be coupled to the processor module 115 to allow for displaying of information to the first user of the electronic device 100. When the electronic device 100 is equipped with a keyboard 130, the keyboard 130 can also be connected with the processor module 115. The electronic device 100 can include a speaker 334, a microphone 336, random access memory (RAM) 326, and flash memory 324, all of which can be coupled to the processor module 115. Other similar components can be provided on the electronic device 100 as well and optionally coupled to the processor module 115. Other communication subsystems 342 and other communication device subsystems 340 are generally indicated as being functionally connected with the processor module 115 as well. An example of the communication subsystem 311 is that of a short range communication system such as BLUETOOTH® communication module or a WI-FI® communication module (a communication module in compliance with IEEE 802.11 set of protocols) and associated circuits and components. The processor module 115 is able to perform operating system functions and enables execution of programs on the electronic device 100. In some embodiments not all of the above components can be included in the electronic device 100.

The auxiliary I/O subsystem 328 can take the form of a trackpad navigation tool, or a trackball, a thumbwheel, a navigation pad, a joystick, touch-sensitive interface, or other I/O interface. While the above examples have been provided in relation to the auxiliary I/O subsystem 328, other subsystems capable of providing input or receiving output from the electronic device 100 are considered within the scope of this disclosure. Other keys can be placed along a side of the electronic device 100. For example, the keys can be function keys, escape keys, volume control keys, scrolling keys, power switches, user programmable keys that can be programmed accordingly, or other user-manipulable keys.

Furthermore, the electronic device 100 can be equipped with components to enable operation of various programs, as shown in FIG. 3. For example, such a program can be a computer application programmed to determine location-based preferred media files or to retrieve directions and maps associated with the current position of the electronic device 100. In an exemplary implementation, the flash memory 324 is enabled to provide a storage location for the operating system 357, device programs 358, and data. The operating system 357 is generally configured to manage other programs 356 that are also stored in memory 324 and executable on the processor 115. The operating system 357 honors requests for services made by programs 358 through predefined program 358 interfaces. More specifically, the operating system 357 typically determines the order in which multiple programs 358 are executed on the processor 115 and the execution time allotted for each program 358, manages the sharing of memory 324 among multiple programs 358, handles input and output to and from other device subsystems 342, and so on. In addition, users can typically interact directly with the operating system 357 through a user interface which can include the keyboard 130 and display screen 110. While in an exemplary implementation the operating system 357 is stored in flash memory 324, the operating system 357 in other embodiments is stored in read-only memory (ROM) or similar storage elements (not shown). As those skilled in the art will appreciate, the operating system 357, device program 358 or parts thereof can be loaded in RAM 326 or other volatile memory.

In one exemplary implementation, the flash memory 324 contains programs 358 for execution on the electronic device 100 including an address book 352, a personal information manager (PIM) 354, and the device state 350. Furthermore, programs 358 and other information 353 including data can be segregated upon storage in the flash memory 324 of the electronic device 100.

When the electronic device 100 is enabled for two-way communication within the wireless communication network 319, the electronic device 100 can send and receive messages from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the electronic device 100 can require a unique identifier to enable the electronic device 100 to transmit and receive messages from the communication network 319. Other systems may not require such identifying information. GPRS, UMTS, and EDGE use a Subscriber Identity Module (SIM) in order to allow communication with the communication network 319. Likewise, most CDMA systems use a Removable User Identity Module (RUIM) in order to communicate with the CDMA network. The RUIM and SIM card can be used in multiple different electronic devices 100. The electronic device 100 can be able to operate some features without a SIM/RUIM card, but the electronic device will not be able to communicate with the network 319. A SIM/RUIM interface 344 located within the electronic device 100 allows for removal or insertion of a SIM/RUIM card (not shown). The SIM/RUIM card features memory and holds key configurations 351, and other information 353 such as identification and subscriber related information. With a properly enabled electronic device 100, two-way communication between the electronic device 100 and communication network 319 is possible.

If the electronic device 100 is enabled as described above or the communication network 319 does not require such enablement, the two-way communication enabled electronic device 100 is able to both transmit and receive information from the communication network 319. The transfer of communication can be from the electronic device 100 or to the electronic device 100. In order to communicate with the communication network 319, the electronic device 100 in the presently described exemplary implementation is equipped with an integral or internal antenna 318 for transmitting messages to the communication network 319. Likewise the electronic device 100 in the presently described exemplary implementation is equipped with another antenna 316 for receiving communication from the communication network 319. These antennae (318, 316 in another exemplary implementation are combined into a single antenna (not shown). As one skilled in the art would appreciate, the antenna or antennae (318, 316) in another implementation are externally mounted on the electronic device 100.

When equipped for two-way communication, the electronic device 100 features the communication subsystem 311. As is understood in the art, the communication subsystem 311 is modified so that the subsystem 311 can support the operational needs of the electronic device 100. The subsystem 311 includes a transmitter 160 and receiver 190 including the associated antenna or antennae (318, 316) as described above, local oscillators (LOs) 313, and a processing module which in the presently described exemplary implementation is a digital signal processor (DSP) 320.

The present disclosure contemplates that communication by the electronic device 100 with the wireless network 319 can be any type of communication that both the wireless network 319 and electronic device 100 are enabled to transmit, receive and process. In general, these can be classified as voice and data. Voice communication generally refers to communication in which messages for audible sounds are transmitted by the electronic device 100 through the communication network 319. Data generally refers to all other types of communication that the electronic device 100 is capable of performing within the constraints of the wireless network 319.

Example device programs that can depend on such data include email, contacts and calendars. For each such program, synchronization with home-based versions of the programs can be desirable for either or both of the program's long term and short term utility. As an example, emails are often time sensitive, so substantially real time synchronization can be desired. Contacts, on the other hand, can be usually updated less frequently without inconvenience. Therefore, the utility of the electronic device 100 is enhanced when connectable within a communication system, and when connectable on a wireless basis in the network 319 in which voice, text messaging, and other data transfer are accommodated.

Even more, the present technology can take the form of hardware, or both hardware and software elements. In some embodiments, the technology is implemented in software, which includes but is not limited to firmware, resident software, microcode, a Field Programmable Gate Array (FPGA) or Application-Specific Integrated Circuit (ASIC), etc. In particular, for real-time or near real-time use, an FPGA or ASIC implementation is desirable.

Figure 4:
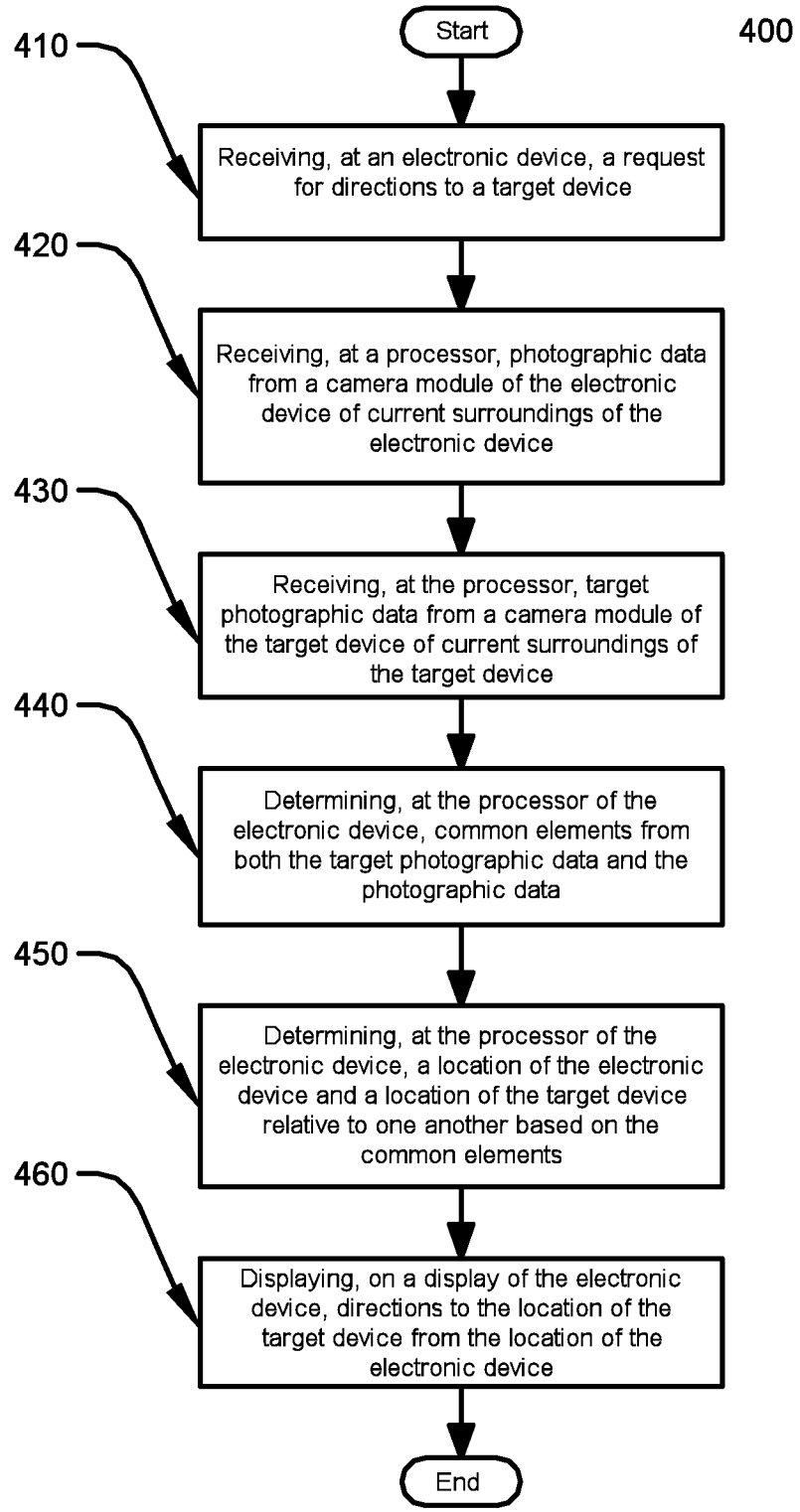
FIG. 4 is a flow chart of a method for relative location detection using image perspective analysis on an electronic device in accordance with an exemplary implementation of the present technology.

Now referring to FIG. 4, a flowchart of a method for providing navigation to a target device location in accordance with an exemplary implementation is illustrated. The exemplary method 400 is provided by way of example, as there are a variety of ways to carry out the method. The method 400 described below refers to steps or instructions which can be carried out using an electronic device and communication network shown in FIG. 3 by way of example, and various elements of FIGS. 1-11 are referenced in explaining exemplary method 400. Each block shown in FIG. 4 represents one or more processes, methods or subroutines, carried out in exemplary method 200.

The exemplary method 400 may begin at block 410. At block 410, the method 400 receives, at an electronic device (e.g. electronic device 100), a request for directions to a target device (e.g. target device 200). For example, the processor 115 of the electronic device 100 can receive the request from the electronic device 110 to determine and retrieve directions to the location of a target device 200. After receiving the request for directions, the method 400 can proceed to block 420.

At block 420, the method 400 comprises receiving photographic data of the current surroundings of the electronic device 100. For example, the processor 115 can receive the photographic data from a camera module (e.g. camera module 140). In at least one implementation, the users of the respective devices may take an image of a landmark visible to both users. The users can agree on a landmark outside of the present application. For example, the users can communicate the agreed-upon landmark by a phone call, email or text message—and both users can take respective photos of the agreed-upon landmark. In the alternative, the first user could send a photo to the second user, who can then try and capture the same image. In another alternative implementation, the users can turn in a circle taking a three-hundred and sixty degree panorama of each of the users' respective location. After receiving the photographic data from the camera module 140, the method 400 can proceed to block 430.

At block 430, the method 400 receives target photographic data of the current surrounding of the target device 200. For example, the processor 115 can receive target photographic data from camera module 240 of the target device 200 of current surroundings of the target device 200.

Method 400 may then proceed to block 440, where the method 400 determines at the processor (e.g. processor 115) of the electronic device 100, common elements from both the target photographic data and the photographic data. For example, the processor 115 can determine overlapping features between the photographic data taken from the two devices. An example of these overlapping features is described herein in relation to FIG. 9. When the common features of the target photographic data and the photographic data is made then the method 400 can proceed to block 450.

At block 450, the method 400 determines, for example, at the processor 115 of the electronic device 100, a location of the electronic device 100 and a location of the target device 200 relative to one another based on one or more common elements of the photographic data. For example, image analysis such as Microsoft Photosynth™ may be used to determine the users' locations with respect to the common landmark.

Figure 10:
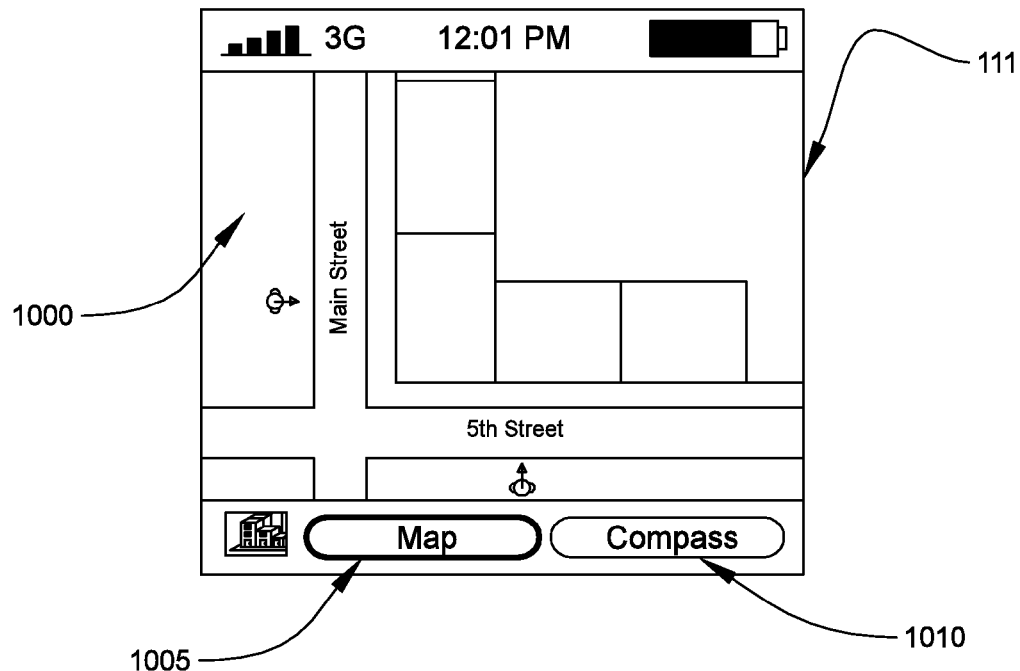
FIGS. 10 and 11 are screenshots depicting the location of the electronic device and the target device with respect to each other in an exemplary implementation of the present technology.
Figure 11:
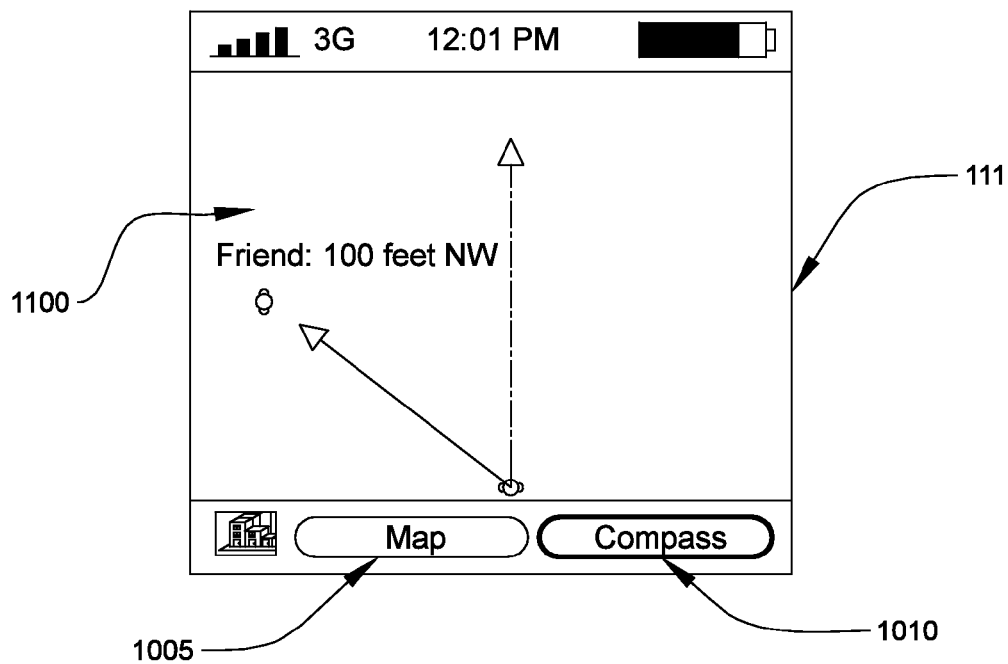

Method 400 may then proceed to block 460, where the method 460 displays directions to the location of the target device 200 from the location of the electronic device 100. For example, the processor 115 can display the directions to the location of the target device 200 on the display 110 of the electronic device 100. In at least one implementation, the directions may be given in the form of a visual depiction on a map (for example, as illustrated in FIG. 10), or in the form of a compass (for example, as illustrated in FIG. 11) output indicating direction and distance. In other embodiments, the directions can be turn-by-turn directions display on the display 110 or can be audible directions. However, one of ordinary skill in the art will appreciate that the directions can comprise one or both of visual and audible directions that allow the first user of the electronic device 100 to navigate towards the location of the second user of the target device 200.

Figure 6:
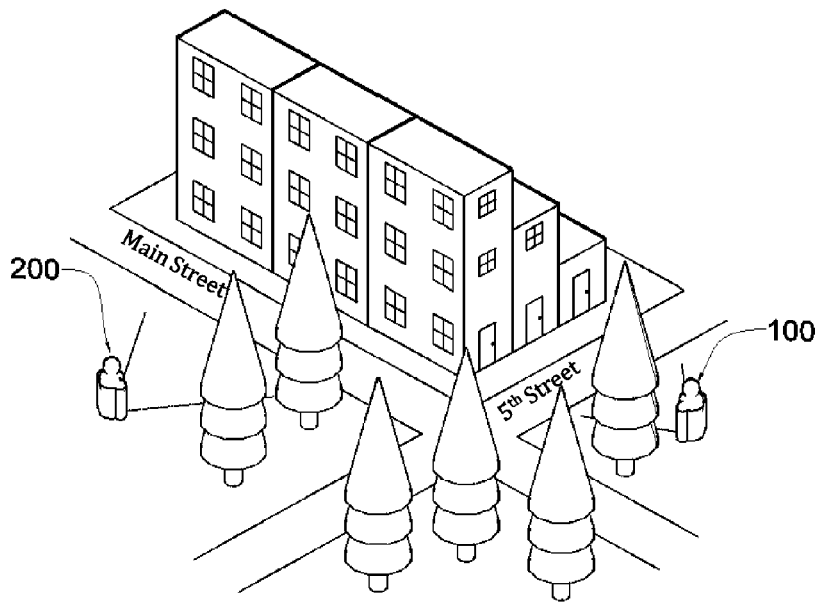
FIG. 6 is an overview illustrating a scenario in which an electronic device could implement the method in accordance with an exemplary implementation of the present technology.

FIGS. 6-11 illustrate exemplary implementations of the method described above for determining the relative location of electronic devices using image perspective analysis to provide navigation from one of the electronic devices to the location of the another electronic device. FIG. 6 is an illustration of a user of an electronic device 100 and a user of a target device 200 that are trying to locate one another. As illustrated in FIG. 6, the first user of the electronic device 100 and the second user of the target device 200 are located at the same intersection, but cannot see each other. For example, the users' views can be obscured due to buildings, people or vegetation. GPS accuracy may not be high enough to resolve the intersection, possibly due to surrounding buildings blocking the signals. Thus the target device 200 and the electronic device 100 can use perspective analysis to determine the relative locations of one another to navigate one of the electronic device 100 and the target device 200 to the other. For example, the target device 200 and the electronic device 100 can execute the method determining the relative locations of electronic devices described herein to navigate to the other device. For example, the users may utilize the camera modules 140, 240 of the electronic device 100 and the target device 200.

Figure 7:
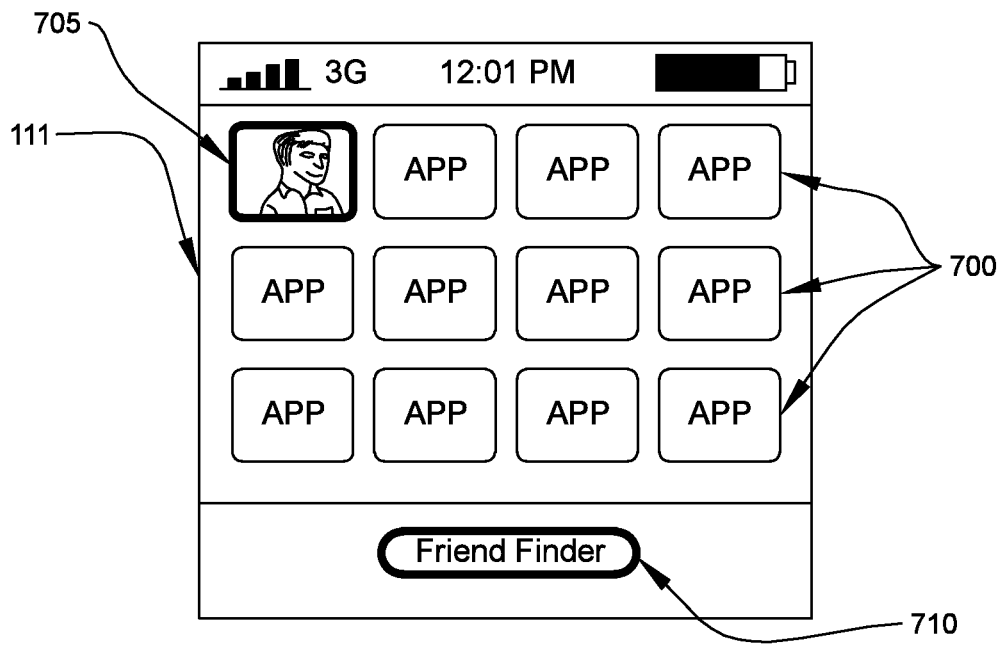
FIG. 7 is a screenshot depicting various applications on an electronic device in accordance with an exemplary implementation of the present technology.

A request for directions to a target device 200 can be initiated at the electronic device 100. In FIG. 7, the request can be made from a software application programmed and executable by a processor 115 of the electronic device 100. For example, the software application can be a map application, a contacts/address book application, a camera application, an application dedicated to locating and determining navigational directions to another electronic device, or any other software application that allows for the detection of another electronic device (e.g., the target device 200) and the determination of navigational directions to the location of the target device 200. For example, a plurality of available software applications 700, including an application for locating a target device 200 and retrieving navigational directions to the target device 200, can be presented on the output screen 111 of the electronic device 100, as illustrated in FIG. 7. In FIG. 7, the icon 705 for a "Friend Finder" application has been selected, and the "Friend Finder" application 705 is the dedicated application for locating and determining navigational directions to another electronic device, such as a target device 200. In at least one implementation, the title 710 of the selected application can be displayed, as illustrated in FIG. 7. Additionally, upon selection of the "Friend Finder" application 705, the "Friend Finder" application 705 can be launched or executed to display a graphical user interface (GUI) from which the user can request and receive navigational directions to another electronic device (e.g. the target device 200).

Figure 8:
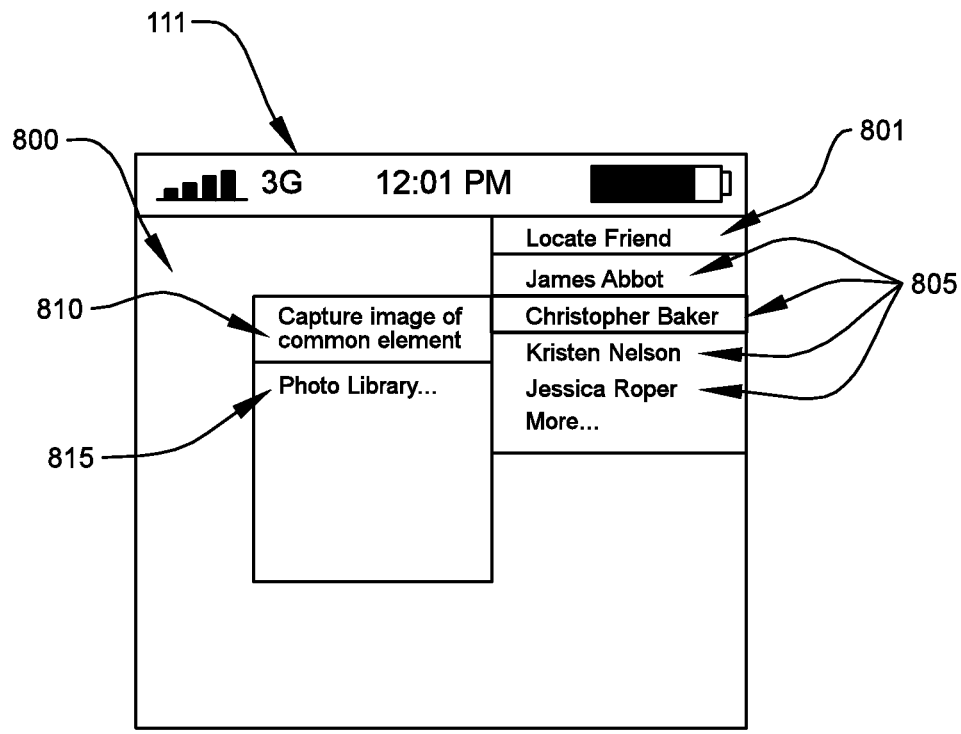
FIG. 8 is a screenshot depicting a drop-down menu for selecting a target device to locate in accordance with an exemplary implementation of the present technology.

FIG. 8 is an illustrative example of a GUI 800 of the "Friend Finder" application illustrated in FIG. 7. In FIG. 8, the "Friend Finder" application 705 has been launched, and a GUI 800 comprising a plurality of menus 801 of user-selectable options can be displayed on the output screen 111 of the electronic device 100. As illustrated in FIG. 8, the menu 801 is a pull-down menu comprising a list of user-selectable names 805 of users of other electronic devices (e.g., target devices) within the vicinity of the electronic device 100 or at the same location (or venue or locale) as the electronic device 100. The first user of the electronic device 100 can select one of the user-selectable names 805, thereby initiating a request to retrieve directions to the location of the second user of the target device 200 of the selected user-selectable name 805. For example, in FIG. 8, the user-selectable name 805 for the target device 200 of Christopher Baker is selected. In one implementation, selection of the user-selectable name 805 displays another menu of selectable-options 810, 815 for enabling perspective analysis to determine and retrieve directions to the location of the target device 200 of the selected user-selectable name 805. For example, in FIG. 8, the menu of user-selectable options 810, 815 comprises two user-selectable options. The first user-selectable option 810 can prompt the user of the electronic device 100 to capture an image of a common element, visible to both users, with the user of the target device 200. The second user-selectable option 815 prompts the user of the electronic device 100 to select an already-captured photo of the current surroundings of the electronic device 100 from the Photo Library (e.g., the library of photos already captured and saved to a memory coupled to the electronic device 100). The already-captured photo can be compared to a photo captured by the target device 200 that shows the current surroundings of the target device 200. While FIG. 8 illustrates a GUI 800 comprising menus, one of ordinary skill in the art will appreciate that the GUI 800 can comprise user-selectable buttons, a dashboard of user-selectable icons, an array of user-selectable icons, or any other GUI from which a user can select target devices to locate and retrieve navigational directions to the location of the selected target device 200.

In FIG. 8, the selectable option of "Capture image of common element" 810 has been selected. In one implementation, selection of selectable option 810 can launch a camera application or display a prompt to the user of the electronic device to launch the camera application to capture an image of a common element visible to both users. Additionally, selection of selectable option 810 can display a prompt on the display of the target device 200 to request that the target device 200 capture an image of a common element of the current surroundings of the target device 200 and the electronic device 100. In FIG. 8, selectable option 810 has been selected, a camera application has been launched, and a prompt has been sent to the target device 200 to capture an image.

Figure 9:
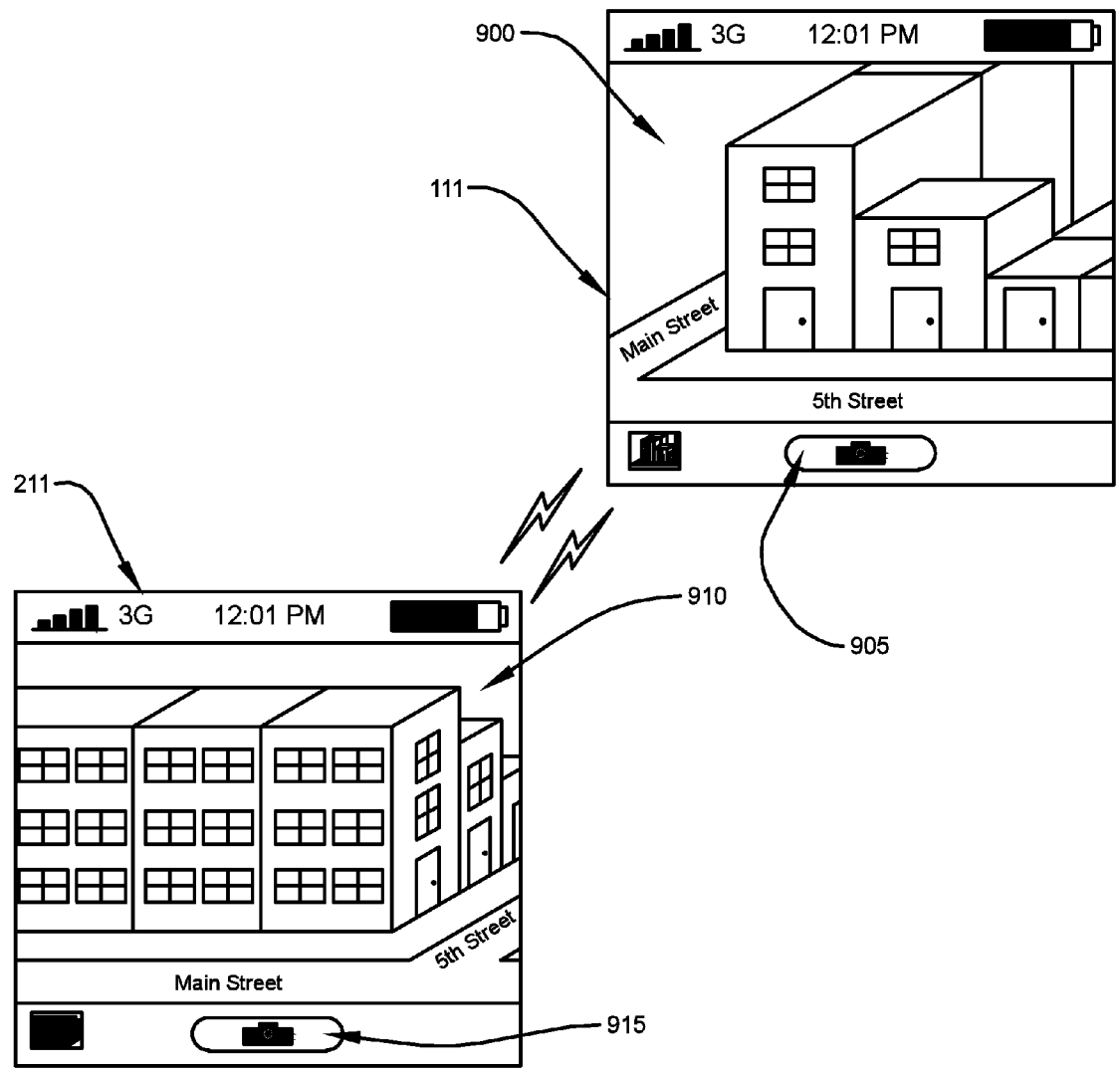
FIG. 9 contains screenshots of both the electronic device and target device in accordance with an exemplary implementation of the present technology.

FIG. 9 is an illustration of the camera application launched as a result of selecting the selectable option 810 illustrated in FIG. 8. In FIG. 9, the camera module 140 of the electronic device 100 has been activated and the GUI of a camera application is displayed on the display of the electronic device 100. The GUI can display a preview of an image 900 that can be captured by the camera module 140. With the camera module 140 activated and the camera application displayed, the user of the electronic device 100 can capture an image of the current surroundings of the electronic device 100. A selectable button 905 can be included which, upon selection, captures the image 900 shown in the GUI of the camera application. The captured image 900 can be sent to a processor 115 communicatively coupled to the electronic device 100 for comparison with an image captured by the target device 200.

In the illustrated implementation of FIG. 9, the electronic device 100 may send data, including instructions, by way of a transmitter 160, to display a prompt on the display 210 of the target device 200. The prompt requests the user of the target device 200 to obtain photographic data of the current surroundings of the target device 200. In FIG. 9, the user of the target device 200 has activated the camera module 240 of the target device 200 to display a GUI of the camera application programmed on the target device 200 which can display a preview of images 910 that can be captured by the camera module 240. Similar to the electronic device 100, a selectable button 915 is provided to allow the user of the target device 200 to capture an image 910 displayed on the GUI of the camera application. When the target device 200 has captured the image 910, the image 910 of the target device 200 can be sent to the electronic device 100 (for example, to the processor 115 communicatively coupled to the electronic device 100) for comparison with the image 900 captured by the electronic device 100.

In the illustrated implementation of FIG. 9, the electronic device 100 can compare the image 900 captured by the electronic device 100 with the image 910 captured by the target device 200 to determine the relative locations of the electronic device 100 and the target device 200, and thereby determine the directions to navigate the electronic device 100 to the location of the target device 200. In FIG. 9, the electronic device 100 can compare the images 900, 910 for common elements between the images 900, 910. For example, a comparison of images 900, 910 indicate that both the electronic device 100 and the target device 200 are proximate to the same buildings and the same streets, namely 5th Street and Main Street. From a comparison of images 900, 910, it can be seen that the image 910 captured by the target device 200 is of a side view of the same building captured in the image 900 captured by the electronic device 100. As such, the electronic device 100 can determine the geographical location of the target device 200 and determine or derive directions to navigate the electronic device 100 to the location of the target device 200. While FIG. 9 illustrates comparing elements and comparing perspectives captured in images 910, 900 of the electronic device 100 and the target device 200, alternative and additional comparisons and information can be utilized to determine the relative locations between the electronic device 100 and the target device 200. For example, motion characteristics sensed by an accelerometer 180, 280 and/or magnetometer 170, 270 of at least one of the electronic device 100 and the target device 200 can be compared and analyzed to determine the relative locations and retrieve directions to navigate the electronic device 100 to the target device 200.

In at least one implementation, a positioning module can be implemented to provide the current positioned of the electronic device 100 and the position of the target device 200 based on the images 900, 910 (e.g., photographic data) of the electronic device 100 and the target device 200. Additionally, the positioning module can provide the relative positions of the target device 200 and the electronic device 100 and can obtain a map of the surrounding area of the electronic device 100 and target device 200, thereby allowing the electronic device 100 or a processor 115 communicatively coupled to the electronic device 100 to determine and retrieve directions to navigate the electronic device 100 to the location or position of the target device 200. While the above implementations discuss obtaining the photographic data obtained from the camera module 140, 240 of either the electronic device 100 or the target device 200, one of ordinary skill in the art will appreciate that the image can comprise video, a plurality of images, or a combination thereof.

In at least one implementation, the relative positions of the target device 200 and the electronic device 100 can be a determination of a relative direction of the location of the target device 200 with respect to the current location of the electronic device 100. In other words, the electronic device 100 can receive an indication that the position of the target device 200 is a distance away from the electronic device 100. For example, the position of the target device 200 is in a northwest direction from the current position of the electronic device 100. The determination of the relative direction of the target device 200 with respect to current location of the electronic device 100 can be determined by comparing the direction at which the electronic device 100 captured the image of the common element of the devices' 100, 200 surroundings to the direction at which the target device 200 captured the image of the common element of the devices' 100, 200 surroundings.

In at least one implementation, the electronic device 100 can capture an image of the front face of a building, and the target device 200 can also capture an image of the front face of the same building. A reference point in the image captured by the electronic device 100 can be determined. The image of the target device 200 can be compared to the image of the electronic device 100 to locate the reference point identified in the image of the electronic device 100 in the image captured by the target device 200. The location of the reference point in the image captured by the target device 200 can provide the relative direction of location the target device 200 with respect to the location of the electronic device 100. For example, a determination can be made that the reference point in the image captured by the target device 200 was captured at a vantage point thirty-degrees counter-clockwise from the vantage point used to capture the image taken by the electronic device 100. Accordingly, a determination can be made that the target device 200 is located thirty-degrees in a counter-clockwise direction from the position the electronic device 100 captured. For example, a notification can be provide to the electronic device 100 that the target device 200 is east-north-east (i.e., a cardinal direction corresponding to a thirty-degrees in a counter-clockwise direction) of the electronic device 100. Thus, relative directions can be determined to indicate in what direction from the electronic device's 100 current location (e.g., relative to the direction of the image the electronic device 100 captured) the target device 100 is located. While reference points can be used to determine the relative direction a target device 200 is located compared to the location of the electronic device 100, alternative mechanisms for determining the relative direction between the electronic device 100 and the target device 200 based on images captured by the respective devices 100, 200 can be implemented. Those of ordinary skill in the art will appreciate that a scale of reference for determining the actual distance between the target device 200 and the electronic device 100 is not necessary when determining the relative direction between an electronic device 100 and a target device 200. However, in some implementations, the actual distance can be desirable.

The actual distance between the target device 200 and the electronic device 100 can be determined by the system and method of relative location detection using image perspective analysis described herein. The actual distance can be determined by identifying a scale of reference from the images captured by the electronic device 100 and the target device 200. For example, the size of objects (for example, the size of cards, doors, people, trees, or other objects) in the image can be used as a scale of reference. In such an implementation, a comparison of the sizes of objects in the image captured by the target device 200 compared to the image captured by the electronic device 100 can indicate the distance between the target device 200 and the electronic device 100. For example, if an object common to both the images captured by the target device 200 and the electronic device 100 is half as large in the image captured by the target device 200 compared that of the electronic device 100, a precise distance separating the electronic device 100 to the target device 200 can be calculated using the scale of reference. In an alternative implementation, the height of the camera module 140, 240 from the ground plane can be determined from image analysis, and the height can be used as a scale reference. For example, the height can correlate to the average eye level height of an individual. In further alternative implementations, the actual distance can be determined using a laser range finder or other similar distance-detecting mechanisms. For example, a laser range finder can determine the distance of the electronic device 100 (or the target device 200, or both devices) to an object common to the images captured by the electronic device 100 and the target device 200. The distances can then be compared to determine the actual distance between the electronic device 100 and the target device 200. However, alternative mechanisms for determining the actual distance between the electronic device 100 and the target device 200 based on images captured by the respective devices 100, 200 can be implemented.

FIGS. 10 and 11 illustrate implementations of displaying the determined relative locations of the electronic device 100 and the target device 200. In at least one implementation, the relative locations of the electronic device 100 and the target device 100, as well as the navigational directions, can be displayed in a GUI that provides a plurality of view buttons 1005, 1010. The view buttons 1005, 1010 can allow the user of the electronic device 100 to choose between a plurality of representations (for example, a map representation and a compass representation).

In FIG. 10, the view button 1005 has been selected. The relative locations of the electronic device 100 and the target device 200 are represented as a map 1000 displayed on the output screen 111 of the electronic device 100. In one implementation, pop-up windows can be displayed to show the navigational directions from the location of the electronic device 100 to the location of the target device 200. In other implementations, the navigational directions can be displayed in an animation, can be displayed by audible turn-by-turn commands, can be displayed in a second window displaying written or typed-out navigational directions, or can be displayed in any other presentation of navigational directions.

In FIG. 11, the view button 1010 has been selected, and the relative locations of the electronic device 100 and the target device 200 are represented in a compass view 1100. Similarly, pop-up windows can be displayed to show the navigational directions from the location of the electronic device 100 to the location of the target device 200. In other implementations, the navigational directions can be displayed in an animation, can be displayed by audible turn-by-turn commands, can be displayed in a second window displaying written or typed-out navigational directions, or any other presentation of navigational directions. While FIGS. 10 and 11 illustrate a compass and map view of the relative locations of an electronic device 100 and a target device 200 and the navigational directions from the electronic device 100 to the target device 200, one of ordinary skill in the art will appreciate that other views can be included or in place of the view illustrated in FIGS. 10 and 11. For example, the relative locations of an electronic device 100 and a target device 200 and the navigational directions from the electronic device 100 to the target device 200 can be represented in an animation, in a satellite map view, in a street-level view, in a balloon view, or in a hybrid view combining any of the previously described views. In other implementations, the relative locations of the devices 100, 200 may also be represented by overlaying on a live video feed, or on the image captured by the user.

Figure 5:
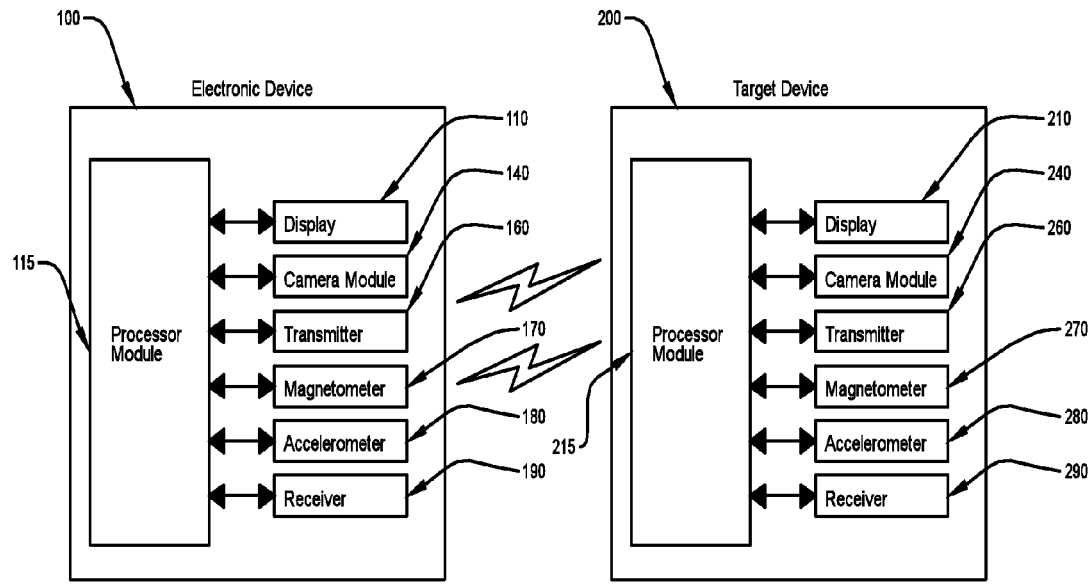
FIG. 5 is a block diagram representing the interaction between a processor and various other components of the electronic device with the processor and various other components of the target device in accordance with an exemplary implementation of the present technology.

Now referring to FIG. 5, shown are two block diagrams, of electronic device 100 and target device 200. In FIG. 5, the two devices 100, 200 are wirelessly communicating during the implementation of this method. The electronic device 100 includes a processor module 115, which is communicatively coupled to a display 110, camera module 140, transmitter 160, and at least one sensor adapted to provide motion characteristics of the electronic device 100, and a receiver 190. Specifically, in FIG. 5, the electronic device 100 can include two sensors. For example, the sensors 170, 180 can provide additional information regarding the location of the electronic device 100 when determining the relative location of the target device 200, and the directions to navigate the electronic device 100 to the location of the target device 200. In FIG. 5, the sensors are a magnetometer 170 and an accelerometer 180, but one of ordinary skill in the art will appreciate that other sensors can be included, such as a nano-gyroscope, a global position module, or other sensors which can detect the motion characteristics of the electronic device 100. Those of ordinary skill in the art will also appreciate that fewer or more sensors can be implemented than as illustrated in FIG. 5. Also, while FIG. 5 illustrates a receiver 190 and a transmitter 160, in another implementation, the receiver 190 and transmitter 160 can be a transceiver.

Also illustrated in FIG. 5 is the target device 200. Similar to the electronic device 100, the target device 200 can include a processor module 215, which is coupled to a display 210, camera module 240, transmitter 260, one or more sensors, and receiver 290. Specifically, in FIG. 5, the target device 200 includes two sensors. For example, the sensors 270, 280 can provide additional information regarding the location of the target device 200 when determining the relative location of the target device 200 with respect to the electronic device 100, and the directions to navigate the electronic device 100 to the location of the target device 200. In FIG. 5, the sensors are a magnetometer 270 and an accelerometer 280, but one of ordinary skill in the art will appreciate that other sensors can be included, such as a nano-gyroscope, a global position module, or other sensors which can detect the motion characteristics of the target device 200. Those of skill in the art will appreciate that fewer or more sensors can be implemented than as illustrated in FIG. 5. Also, while FIG. 5 illustrates a receiver 290 and a transmitter 260, in another implementation, the receiver 290 and transmitter 260 can be a transceiver. An example of the communication and determination of relative locations of two electronic devices, such as the electronic device 100 and the target device 200 illustrated in FIG. 5, using perspective analysis is illustrated in FIG. 6.

In at least one implementation, relative location detection using image perspective analysis could be used by the user of an electronic device 100 to find buildings or other locations. For example, a proprietor of a business can take photographic data from the business storefront, which may comprise a single image, a plurality of images, or video. This photographic data can be made available publicly, either through the business' website, or through a third party database created for such a purpose. The user of an electronic device 100 can then select this image from the database, and use this image as the current surroundings of the "target device" 200. The method disclosed herein can then provide the analysis to determine the relative location of the electronic device with respect to the business in the photographic data.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Furthermore, the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums as signal carriers per se are not included in the definition of physical computer-readable medium). Examples of a physical computer-readable medium include a semiconductor or solid state memory, removable memory connected via USB, magnetic tape, a removable computer diskette, a random access memory (RAM), a read-only memory (ROM), a rigid magnetic disk, an optical disk, and non-transitory memory. Current examples of optical disks include compact disk-read only memory (CD-ROM), compact disk-read/write (CD-R/W), DVD, and Blu Ray™.

Embodiments within the scope of the present disclosure may also include tangible and/or non-transitory computer-readable storage media for carrying or having computer-executable instructions or data structures stored thereon. Additionally, non-transitory memory also can store programs, device state, various user information, one or more operating systems, device configuration data, and other data that may need to be accessed persistently. Further, non-transitory computer-readable storage media expressly exclude media such as energy, carrier signals, electromagnetic waves, and signals per se. Such non-transitory computer-readable storage media can be any available media that can be accessed by a general purpose or special purpose computer, including the functional design of any special purpose processor as discussed above. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media. Both processors and program code for implementing each medium as an aspect of the technology can be centralized or distributed (or a combination thereof) as known to those skilled in the art.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

A data processing system suitable for storing a computer program product of the present technology and for executing the program code of the computer program product will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modem, Wi-Fi, and Ethernet cards are just a few of the currently available types of network adapters. Such systems can be centralized or distributed, e.g., in peer-to-peer and client/server configurations. In some embodiments, the data processing system is implemented using one or both of FPGAs and ASICs.

One of ordinary skill in the art will appreciate that the features in each of the figures described herein can be combined with one another and arranged to achieve the described benefits of the presently disclosed system and method of relative location detection on an electronic device using image perspective analysis. Additionally, one of ordinary skill will appreciate that the elements and features from the illustrated embodiments herein can be optionally included to achieve the described benefits of the presently disclosed system and method of relative location detection on an electronic device using image perspective analysis. Various modifications to and departures from the disclosed embodiments will occur to those having skill in the art.

What is claimed is:

1. A method for providing navigation to a target device location, comprising:
    receiving, at a processor of an electronic device, a request for directions to a target device;
    receiving, at the processor, photographic data from a camera module of the electronic device of current surroundings of the electronic device;
    receiving, at the processor, target photographic data from a camera module of the target device of current surroundings of the target device;
    determining, at the processor, at least one common element from both the target photographic data and the photographic data;
    determining, at the processor, a location of the electronic device and a location of the target device relative to one another based on the at least one common element; and
    displaying, on a display of the electronic device, directions to the location of the target device from the location of the electronic device.

2. The method of claim 1, further comprising displaying on the display, a map including directions to the location of the target device.

3. The method of claim 1, further comprising displaying, on the display, a compass providing directional instructions to the location of the target device.

4. The method of claim 1, further comprising displaying, on the display, a prompt to obtain photographic data of current surroundings of the electronic device.

5. The method of claim 1, further comprising sending, from a transmitter, data including instructions to display a prompt on a display of the target device to obtain photographic data of current surroundings of the target device.

6. The method of claim 1, further comprising receiving motion data from at least one sensor.

7. The method of claim 6, wherein the at least one sensor is one of an accelerometer and a magnetometer.

8. The method of claim 6, wherein the motion data provides motion characteristics associated with at least one of the electronic device and the target device, wherein the motion characteristics are used in the determination of the location of the electronic device.

9. The method of claim 6, wherein the motion data provides motion characteristics associated with at least one of the electronic device and the target device, wherein the motion characteristics are used in the determination of the location of the target device.

10. The method of claim 1, wherein the photographic data comprises video.

11. The method of claim 1, wherein the photographic data comprises multiple images.

12. An electronic device comprising:
    a display;
    a processor coupled to the display, the processor configured to execute instructions to:
        receive a request for directions to a target device;
        receive photographic data from a camera module of the electronic device of current surroundings of the electronic device;
        receive target photographic data from a camera module of the target device of current surroundings of the target device;
        determine common elements from both the target photographic data and the photographic data;
        determine a location of the electronic device and a location of the target device relative to one another based on the common elements; and
        display directions to the location of the target device from the location of the electronic device.

13. The electronic device of claim 12, further comprising at least one sensor for detecting motion of the electronic device.

14. The electronic device of claim 13, wherein the at least one sensor comprises one of an accelerometer and a magnetometer.

15. The electronic device of claim 12, wherein the received target photographic data comprises video.

16. The electronic device of claim 12, further comprising a positioning module capable of providing a current position of the device and the position being used in conjunction with the target photographic data to obtain a map of the surrounding area.

17. A non-transitory computer readable medium, comprising instruction to cause a processor to:
    receive a request for directions to a target device;
    receive photographic data from a camera module of the electronic device of current surroundings of the electronic device;
    receive target photographic data from a camera module of the target device of current surroundings of the target device;
    determine common elements from both the target photographic data and the photographic data;
    determine a location of the electronic device and a location of the target device relative to one another based on the common elements; and
    display directions to the location of the target device from the location of the electronic device.

18. The non-transitory computer readable medium of claim 16, further comprising instruction to cause a processor to display a map including directions to the location of the target device.

19. The non-transitory computer readable medium of claim 16, further comprising instruction to cause a processor to display a compass providing directional instructions to the location of the target device.

20. The non-transitory computer readable medium of claim 16, further comprising instruction to cause a processor to display a prompt to obtain photographic data of current surroundings of the electronic device using the camera module of the electronic device.

\* \* \* \* \*